United States Patent
Kennedy (10) Patent No.: US 9,836,863 B2
(45) Date of Patent: Dec. 5, 2017

(54) METHOD AND SYSTEM FOR VISUALIZATION OF ATHLETES

(71) Applicant: Disney Enterprises, Inc., Burbank, CA (US)

(72) Inventor: Howard Kennedy, Burbank, CA (US)

(73) Assignee: DISNEY ENTERPRISES, INC., Burbank, CA (US)

(*) Notice: Subject to any disclaimer, the term of this patent is extended or adjusted under 35 U.S.C. 154(b) by 728 days.

(21) Appl. No.: 13/651,762

(22) Filed: Oct. 15, 2012

(65) Prior Publication Data

US 2014/0104496 A1    Apr. 17, 2014

(51) Int. Cl.
| | |
|---|---|
| H04N 7/18 | (2006.01) |
| G06T 11/20 | (2006.01) |
| H04N 5/232 | (2006.01) |
| H04N 21/234 | (2011.01) |
| H04N 21/236 | (2011.01) |
| H04N 21/431 | (2011.01) |
| H04N 21/2365 | (2011.01) |

(52) U.S. Cl.
CPC ....... *G06T 11/206* (2013.01); *H04N 5/23206* (2013.01); *H04N 21/23418* (2013.01); *H04N 21/23614* (2013.01); *H04N 21/4312* (2013.01); *H04N 21/2365* (2013.01)

(58) Field of Classification Search
CPC ..... G06T 19/006; G06T 15/205; G06T 13/40; G06T 19/00; G06T 2207/10016; G06T 2207/20104; G06T 7/004; G06T 7/20; G06K 9/00671; G06K 9/00342; G06K 9/00355; G06K 9/00375; G06K 9/00771
USPC ............. 348/77, 135, 137, 140, 143, 157, 348/169–172; 382/106–107
See application file for complete search history.

(56) References Cited

U.S. PATENT DOCUMENTS

| | | |
|---|---|---|
| 5,395,137 A | 3/1995 | Kim |
| D450,685 S | 11/2001 | Augusta |
| 6,885,971 B2 | 4/2005 | Vock et al. |
| 7,192,328 B2 | 3/2007 | Zawitz |
| 2005/0265580 A1 | 12/2005 | Antonucci et al. |
| 2006/0181074 A1 | 8/2006 | Kawai |
| 2007/0064104 A1* | 3/2007 | Ikeda ........................... 348/143 |

(Continued)

OTHER PUBLICATIONS

Alexander Szep. "*Measuring Ball Spin in Monocular Video*" Institute of Computer Technology, Vienna University of Technology, Gußhausstr. 27-29/384, A-1040 Vienna, Austria, 16$^{th}$ Computer Vision Winter Workshop, Andreas Wendel, Sabine Sternig, Moartin Godec, (eds.) Mitterberg, Austria, Feb. 2-4, 2011, 7 pps.

(Continued)

*Primary Examiner* — Jared Walker
(74) *Attorney, Agent, or Firm* — Fay Kaplun & Marcin, LLP (57) ABSTRACT

A system and method for receiving positional data corresponding to stages of movement of a person within a time interval, determining from the positional data, at each stage of movement, one of: a position, an orientation, and a pose of the person, and based on the one of the position, the orientation, and the pose of the person determined for each stage of movement, generating a visualization graphic, separate from a display of the person, that illustrates one of the positions, orientations, and poses of the person at the stages of movement within the time interval.

19 Claims, 8 Drawing Sheets

(56) References Cited

U.S. PATENT DOCUMENTS

| | | | |
|---|---|---|---|
| 2008/0129825 A1* | 6/2008 | DeAngelis et al. | 348/169 |
| 2009/0015678 A1* | 1/2009 | Hoogs | G06T 7/004 |
| | | | 348/207.1 |
| 2009/0262137 A1* | 10/2009 | Walker et al. | 345/629 |
| 2010/0020068 A1* | 1/2010 | House | G06T 15/20 |
| | | | 345/419 |
| 2011/0169959 A1* | 7/2011 | DeAngelis et al. | 348/157 |
| 2011/0175809 A1* | 7/2011 | Markovic | A63F 13/10 |
| | | | 345/158 |

OTHER PUBLICATIONS

Tashiro et al. "*A Study on Motion Visualization System Using Motion Capture Data*", 17$^{th}$ International Conference on Artificial Reality and Telexistence 2007, 2 pages, Tokyo Denki University, 2-2 Kanda-Nishiki-cho, Chiyoda-ku, Tokyo, 101-8457, Japan.

* cited by examiner

Figure 1

Display 200

METHOD AND SYSTEM FOR VISUALIZATION OF ATHLETES

BACKGROUND

Viewers of some sporting events may have difficulty following rapidly occurring movement. In some events, such as figure skating, diving and snowboarding, it may be desirable to represent the motion of participants in a graphical manner that may make it easier for viewers to follow rapid actions of the participants.

SUMMARY OF THE INVENTION

A method for receiving positional data corresponding to stages of movement of a person within a time interval, determining from the positional data, at each stage of movement, one of: a position, an orientation, and a pose of the person, and based on the one of the position, the orientation, and the pose of the person determined for each stage of movement, generating a visualization graphic, separate from a display of the person, that illustrates one of the positions, orientations, and poses of the person at the stages of movement within the time interval.

A system having a data source collecting positional data corresponding to stages of a movement of a person within a time interval and a data server. The data server including a a data receiving module receiving the positional data, a calculation module determining, based on the positional data at each of the stages of movement within the time interval, one of a position, an orientation and a pose of the person and graphical processing module generating, based on the one of the position, the orientation, and the pose of the person determined for each stage of movement a visualization graphic, separate from a display of the person, that illustrates the one of the positions, the orientations and the poses of the person at the stages of movement within the time interval.

DETAILED DESCRIPTION

The exemplary embodiments may be further understood with reference to the following description of exemplary embodiments and the related appended drawings, wherein like elements are provided with the same reference numerals. Specifically, the exemplary embodiments relate to methods and systems for visualizing rapid motion of athletes.

Viewers of some sporting events may have difficulty following rapidly movement by athletes participating in the sporting events. In some events, such as figure skating, diving and snowboarding, it may be desirable to represent the motion of athletes in a graphical manner that may make it easier for viewers to follow rapid actions of the participants. Appreciating these actions, which occur in three dimensions, may require intense concentration even by fans of the sports, and non-fans may find them incomprehensible.

Previous techniques for the visualization of such athletes have included slow-motion replays and stutter/strobe illustrations where still images of the athlete at various points in time are displayed concurrently (i.e., as if the athlete is being illuminated with a strobe light and an image is frozen each time the strobe flashes). The exemplary embodiments provide for better visualization of the movement of athletes in three dimensions, particularly where the movement of such athletes may be difficult to follow unaided. Those of skill in the art will understand that the specific implementation details and techniques described herein, including those of the exemplary embodiments, may be implemented using differing techniques.

Figure 1:
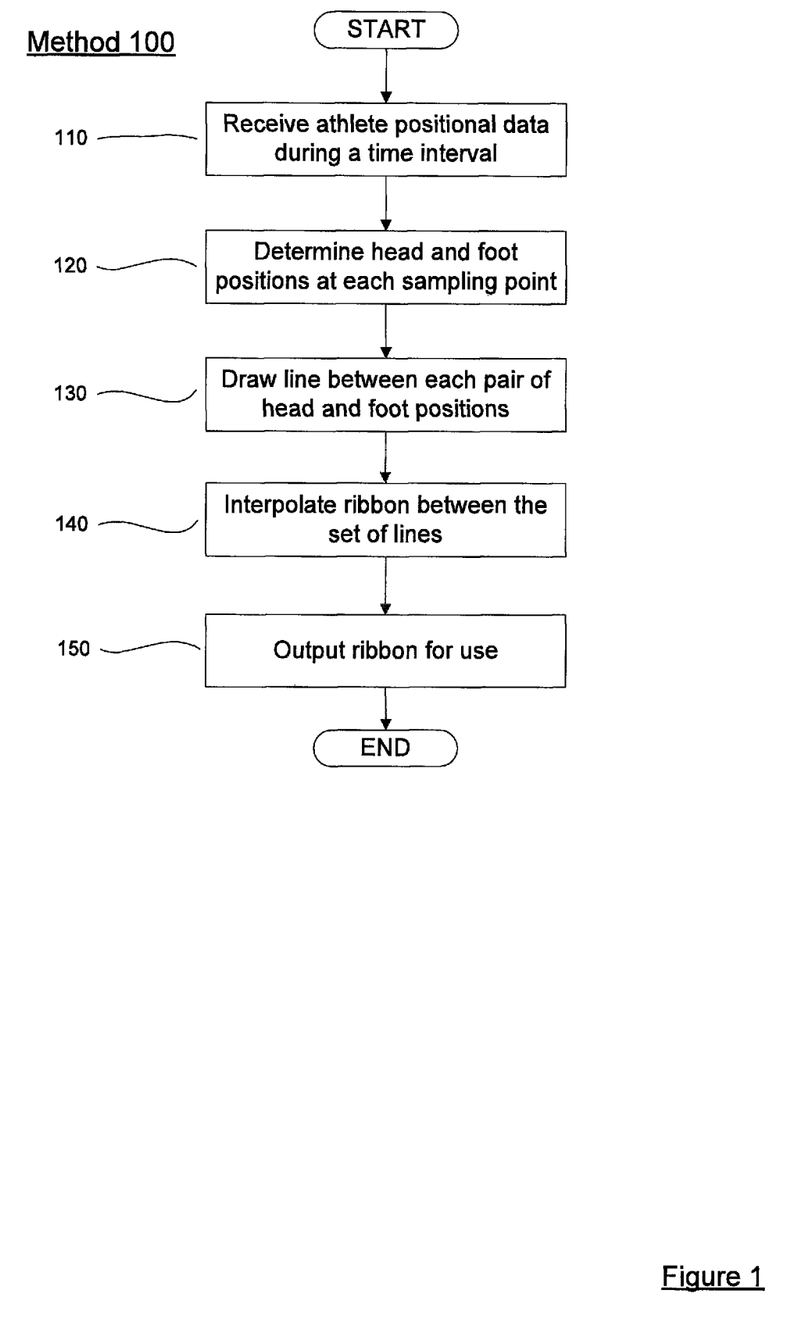
FIG. 1 illustrates an exemplary method for rendering a visualization of the motion of athletes according to an exemplary embodiment.

FIG. 1 illustrates an exemplary method 100 providing for the visualization of the motion of an athlete in three-dimensional space. In step 110, positional data is received for the athlete over a given time interval. The time interval may be an appropriate interval for the sport in which the athlete is participating (e.g., for a diver, the time interval may be an entire dive; for a figure skater, the time interval may be the duration of a jump; etc.). The positional data may be sampled periodically during the interval, at a sampling frequency that is appropriate for the sport in which the athlete is participating. The positional data may be sampled several times per second, but does not typically need to be sampled at a video frame rate (e.g., 60 frames per second). The sampling rate may be predetermined or variable, and may typically be selected by a broadcaster of the sporting event to be high enough to capture the details of the athlete's body movements.

Positional data may be from a single source or from a plurality of sources. In one exemplary embodiment, multiple video cameras may be used to record video of the athlete, and stereo vision techniques may be used to determine the exact position of the athlete in three-dimensional space; however, such calculations may be processing-intensive. In another exemplary embodiment, sensors may be embedded into the athlete's uniform, or fixed on the athlete's body in some other manner; such sensors may record the athlete's position (e.g., with a GPS receiver) and orientation (e.g., with inertial sensors, accelerometers, etc.), and the sensors may be used to record positional data for the athlete; for example, such sensors may be found in smart phones or other similar mobile computing devices. In another exemplary embodiment, data from sensors such as described above and recorded video may be combined to determine the position of the athlete. The data used in such a combined embodiment may include both video data from external cameras and video data from an on-board camera (e.g., a head-mounted camera, a camera integrated into a sensor package such as a smart phone, etc.). The positional data may be determined in real time as the sporting event is occurring, or may be recorded and exported to a more powerful system for subsequent processing. In one embodiment, the athlete's positional data may be expressed as [X, Y, Z, yaw, pitch, roll] relative to a venue-specific reference frame; at a minimum, the positional data may be expressed as [X, Y, Z].

In step 120, the positions of two of the athlete's extremities are determined for each sample of the athlete's position; in another exemplary embodiment, the results of steps 110 and 120 may be achieved in a single step, such as by directly measuring the location with sensors located at the extremities. In one embodiment, this may be performed by determining a position representing the center of the athlete (e.g., the location of a positional sensor) and determining extremity locations based on the size of the athlete and the orientation as determined by inertial sensors or other similar sensors. In another embodiment, this may be accomplished based on stereovision techniques using solely video data of the athlete.

In one embodiment, the extremities may be the locations of the athlete's head and feet, and the exemplary embodiments described herein make reference to the position of the athlete's head and feet and a graphical representation based on such positions; however, in an alternative embodiment, the positions determined in this step may represent the left and right sides of the athlete rather than the top and bottom (i.e., head and foot). In such an embodiment, the positions may be determined based on the athlete's orientation and "wingspan" (e.g., of the athlete's shoulders or arms). Such a representation may be preferable for some sports, such as diving.

In step 130, a line segment within three-dimensional space is drawn between the points representing the athlete's head and feet for each sample of the athlete's position. This may be performed using standard graphical techniques. In step 140, a graphic is created and rendered reflecting a continuous path within three-dimensional space, drawn between and through the line segments drawn in step 130; this graphic will be referred to hereinafter as a "ribbon". The ribbon may be drawn using known interpolation techniques; smooth spline interpolation is a standard feature of many rendering engines.

In step 150, the ribbon created in step 140 is output for subsequent use or display. Those of skill in the art will understand that the specific nature of this step may vary widely among differing embodiments, and that the specific manners of use to be described herein are only exemplary. In one embodiment, the ribbon may be rendered into a two-dimensional view using standard techniques. For example, the two-dimensional view may be the field of view of a video broadcast of the athlete, such as the view of a television broadcast. The ribbon may be superimposed over one or more still images of the athlete in such a view. In such a view, the ribbon and various athlete positions may be shown in a static manner, or, alternately, the ribbon and various athlete positions may be shown in motion so that, as the athlete performs, a trail of ghost images is left for the viewer to see.

Figure 2:
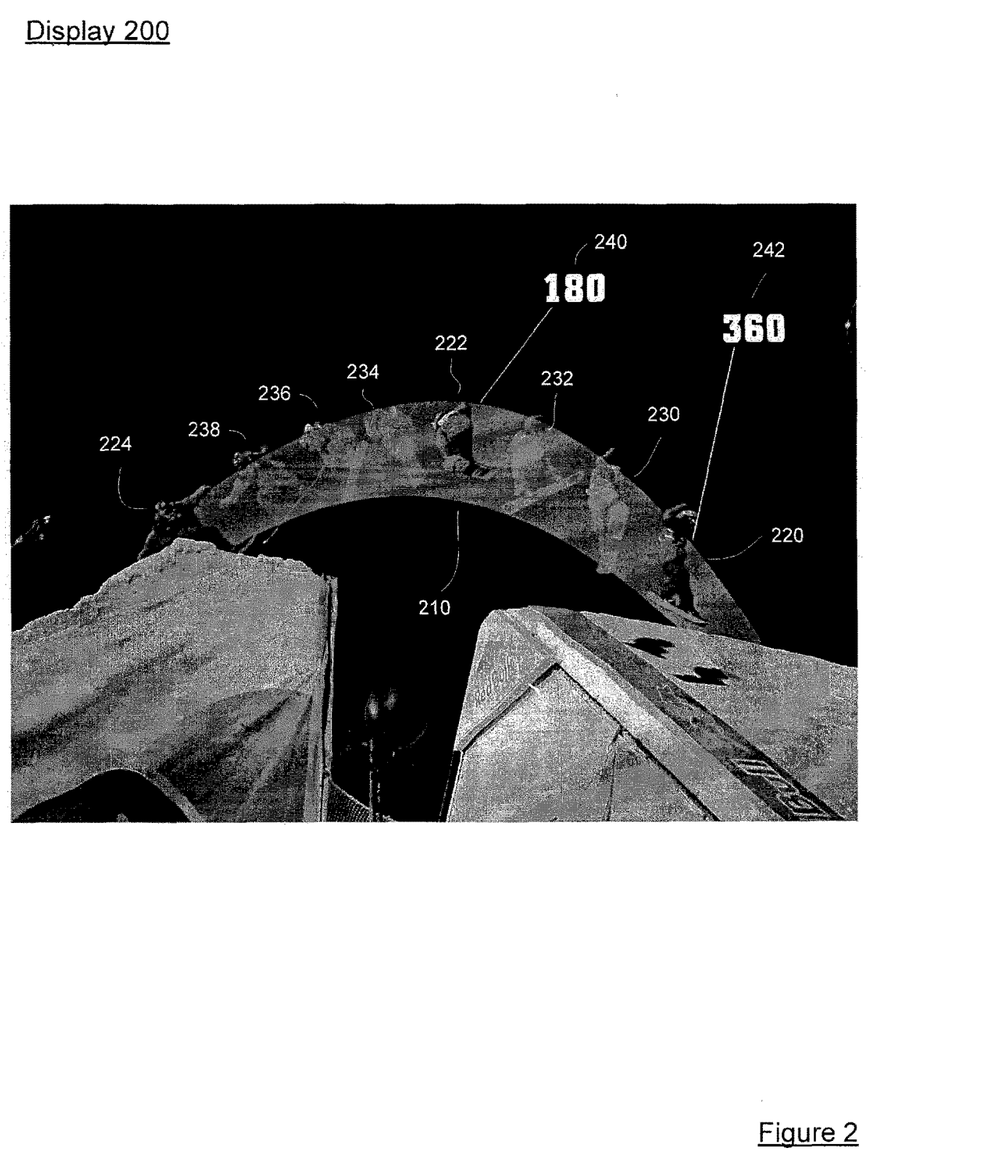
FIG. 2 illustrates a first exemplary visualization of the motion of an athlete according to the exemplary method of FIG. 1.

FIG. 2 illustrates a first exemplary display 200 including an exemplary output of the method of FIG. 1. In FIG. 2, the athlete shown is a snowboard jumper. The ribbon 210 is shown superimposed over still images of the athlete of FIG. 2, who is shown in full saturation in a first position 220, a second position 222, and a third position 224. The athlete is also shown in lighter saturation (e.g., "ghosted") in ghost positions 230, 232, 234, 236 and 238. The display 200 also includes angle labels 240 and 242, indicating the angular progress of the athlete through a spin at the points indicated by the labels. The angle labels 240 and 242 may be manually added by a broadcaster providing the display 200, or, alternately, may be added automatically, at fixed time intervals (e.g., every half second) or at times of maximal acceleration, angular velocity, or other pertinent physical maxima/minima. In the example where the athlete is a snowboarder, the angle may be determined by analyzing the orientation of the snowboard.

The superimposition of the ribbon 210 and the labels 240 and 242 over the various positions of the athlete may thereby enable a viewer of the display 200 to follow the progress of the athlete through the jump shown. Additionally, those of skill in the art will understand that while FIG. 2 is a still image showing still illustrations of the athlete in the various positions described above, the ribbon 210 and the labels 240 and 242 may alternately be superimposed over a video of the athlete moving through the jump being illustrated. In such an embodiment, the projection of the three-dimensional ribbon into two dimensions may be continuously updated as the camera angle follows the athlete.

Figure 3:
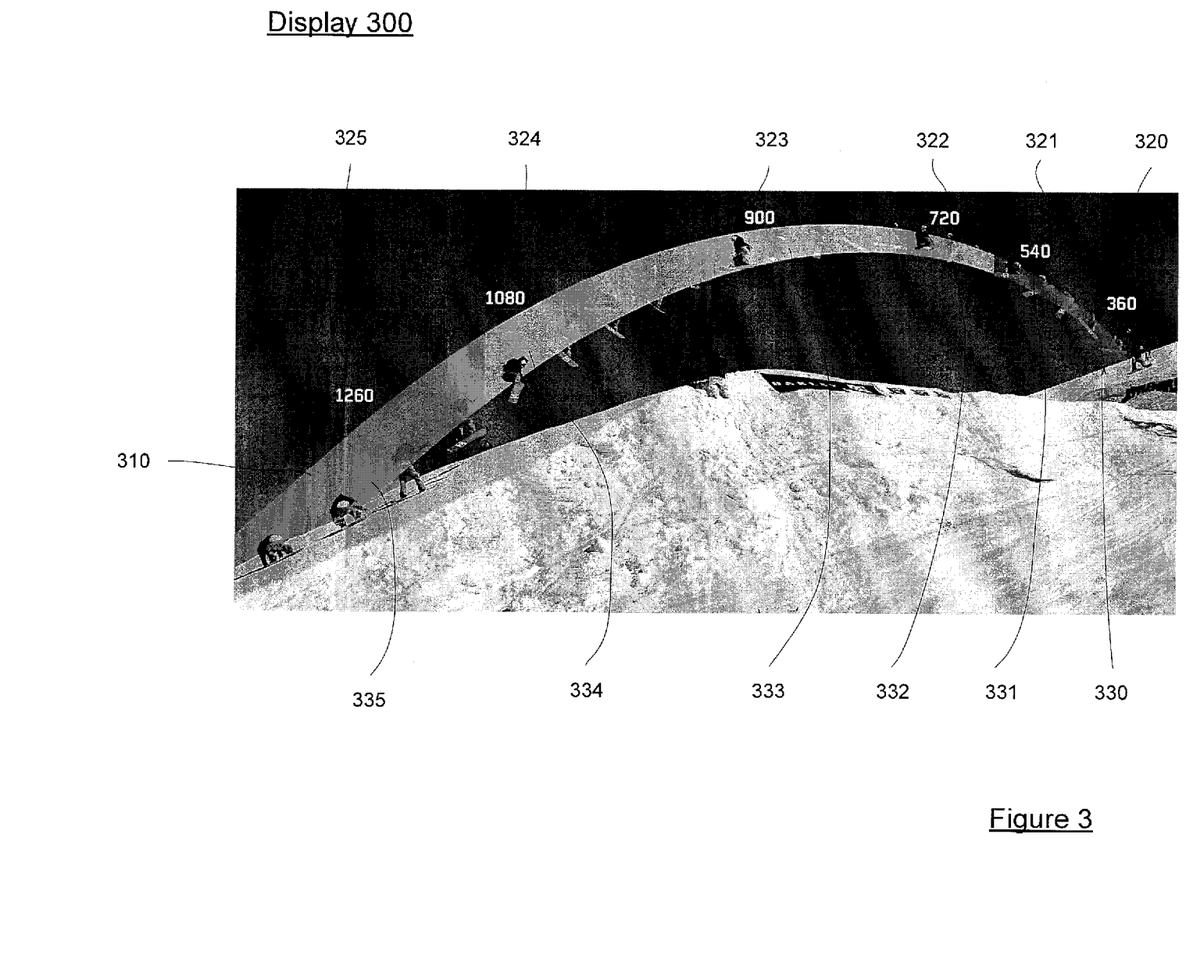
FIG. 3 illustrates a second exemplary visualization of the motion of an athlete according to the exemplary method of FIG. 1.

FIG. 3 illustrates another exemplary display 300 including an exemplary output of the method of FIG. 1. In FIG. 3, like in FIG. 2, the athlete shown is a snowboard jumper. The display 300 includes a ribbon 310 showing the progress of the athlete through a jump. The display 300 also includes images of the athlete similar to those described above with reference to FIG. 2. The display 300 also includes labels 320, 321, 322, 323, 324 and 325, representing the angular progress of the athlete through the jump. The ribbon 310 is subdivided into differently shaded portions 330, 331, 332, 333, 334, and 335, with each portion representing a portion of the jump. For example, portion 330 represents the portion of the jump from its start through label 320, representing the athlete's first 360 degrees of rotation; portion 331 represents the portion of the jump from label 320 through label 321, representing the athlete's continued rotation from 360 degrees to 540 degrees. Those of skill in the art will understand that the specific shades used to shade the ribbon 310 are only exemplary, and that varying shades or colors may be used. In one exemplary embodiment, the shades or colors may vary to represent the speed of the athlete's rotation (e.g., ranging from green representing slow rotation to red representing fast rotation), the athlete's linear speed (e.g., ranging from green representing slow linear speed to red representing fast linear speed), or the athlete's acceleration. In another exemplary embodiment, the opacity of the ribbon 310 may vary (e.g., the ribbon may be more transparent where the linear or angular motion of the athlete is slower and more opaque where the linear or angular motion of the athlete is more rapid, or vice versa) in order to assist the viewer in following the motion of the athlete.

Figure 4A:
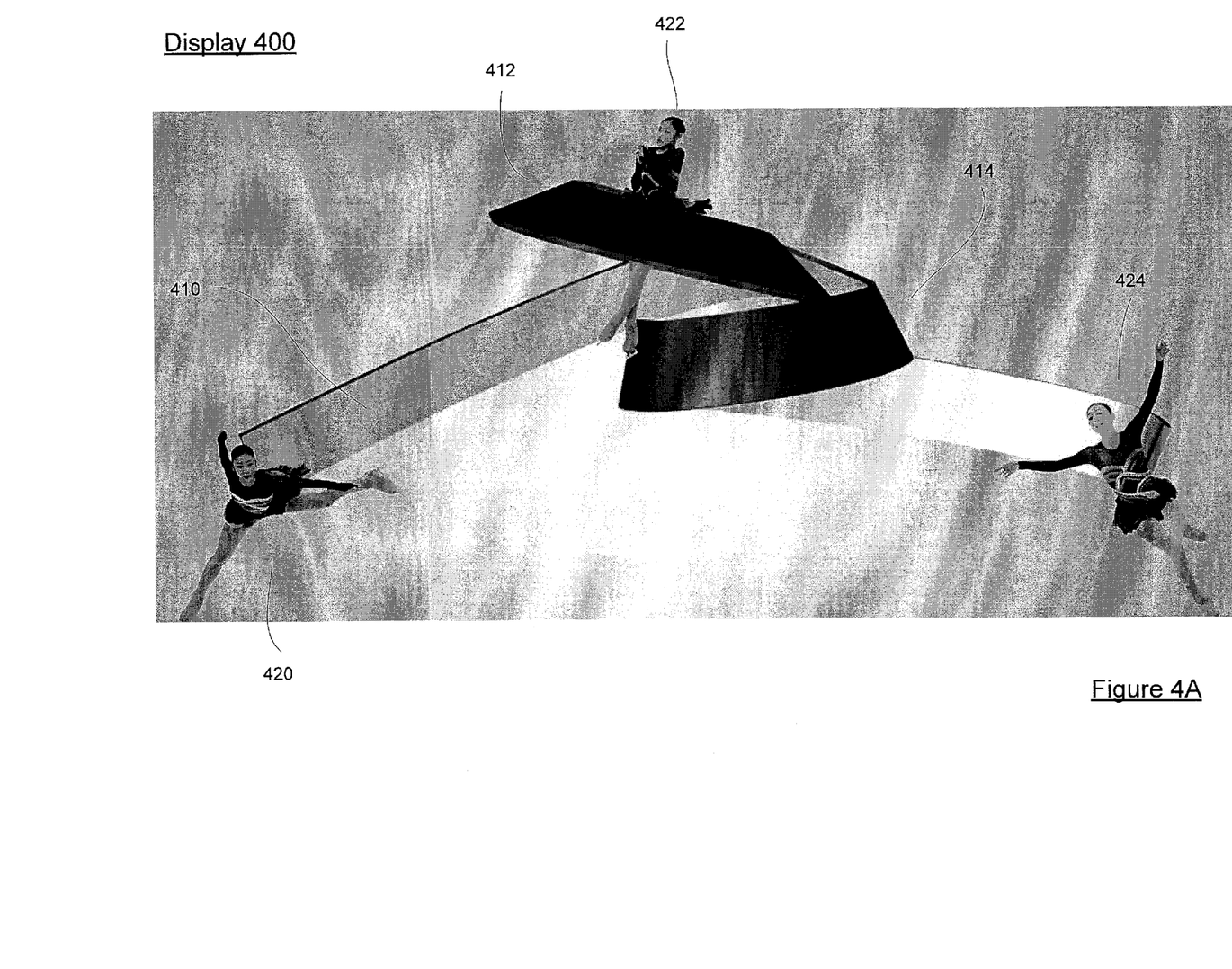
FIG. 4A illustrates a third exemplary visualization of the motion of an athlete according to the exemplary method of FIG. 1.

FIG. 4A illustrates another exemplary display 400 including an exemplary output of the method of FIG. 1. In FIG. 4A, the athlete shown is a figure skater performing a jump. The display 400 includes a ribbon 410 showing the progress of the athlete through the jump. The display also includes images 420, 422 and 424 of the athlete at various points during the jump; as discussed above, those of skill in the art will understand that the ribbon 410 may also be shown on a video display of the athlete performing the jump. The ribbon 410 deflects outward toward its bottom at deflected portions 412 and 414. In deflected portions 412 and 414, the ribbon does not strictly represent the head and foot positions of the athlete, but, rather, is deflected outward to represent the angular rotation (i.e., spinning) of the athlete.

This deflection may be understood as similar to the manner in which an item worn by an athlete may deflect outward and upward from the athlete's body due to centrifugal force. The positioning of the deflected ribbon may therefore be determined by determining the rate of the athlete's angular rotation, determining an amount of centrifugal force exerted by such rotation, and determining a deflection angle proportional to such centrifugal force. In one embodiment, a predetermined maximum deflection angle may be determined (e.g., 45 degrees from vertical, 60 degrees from vertical, etc.), and the determination of the deflection angle may be made in such a manner such that the deflection angle is the maximum deflection angle at the athlete's maximum rate of angular rotation, and is correspondingly less at slower rates of angular rotation. Thus, for example, the deflection portion 412, which is deflected at a greater angle from the vertical than the deflected portion 414, may indicate a greater rate of angular rotation. Additionally, the length of the ribbon 410 may be truncated from its full length (i.e., the distance from the athlete's head to foot), in order that the ribbon 410 may be fully opaque but still not obscure the viewer's ability to see the athlete in the display 400.

Figure 4B:
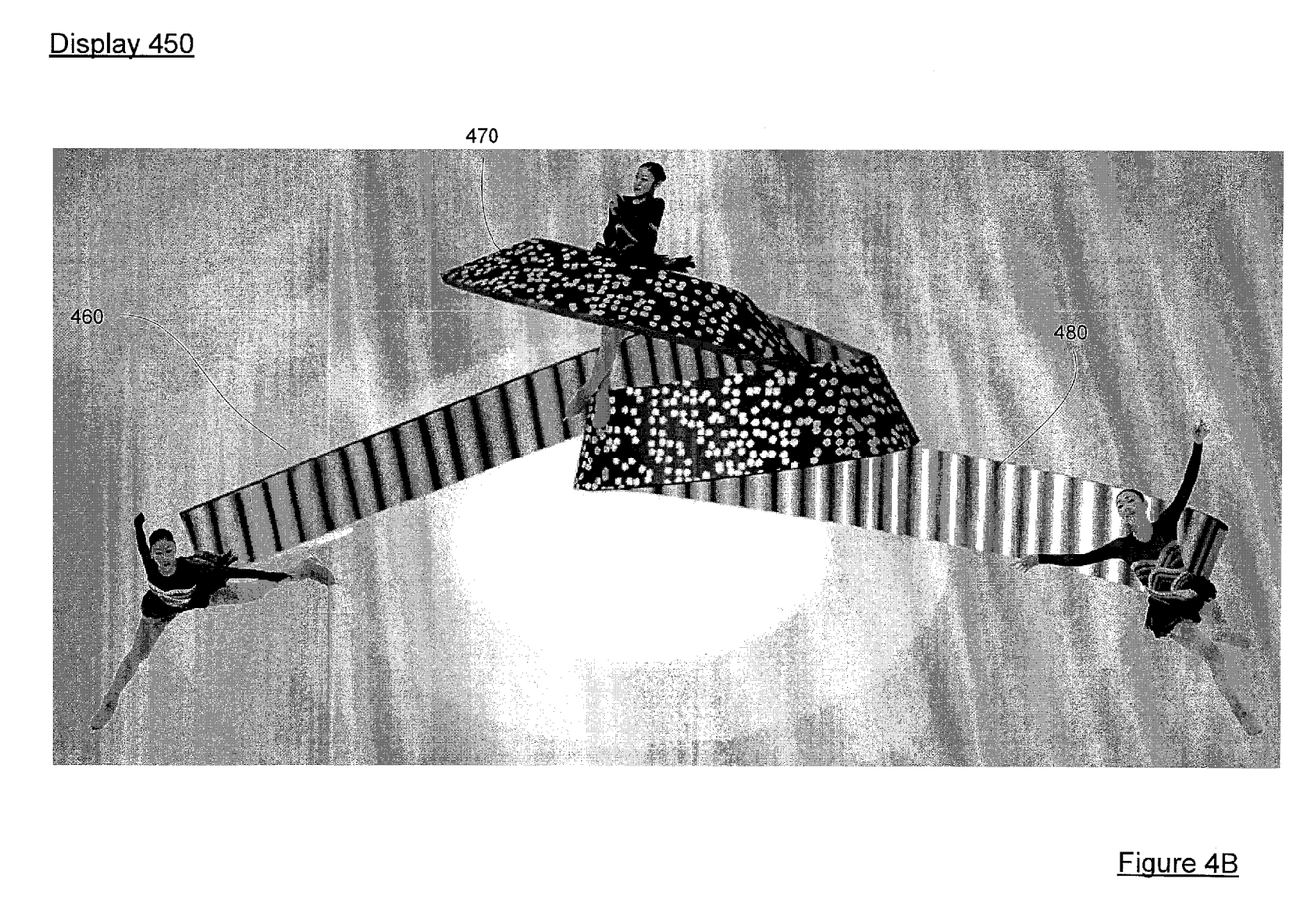
FIG. 4B illustrates the third exemplary visualization of FIG. 4A with additional graphical features.

FIG. 4B illustrates a display 450 that is a modified version of the display 400 of FIG. 4A. In the display 450, the ribbon 460 is not shown with a solid color, but, rather, includes a first pattern 470 and a second pattern 480, with each pattern corresponding to one side of the ribbon. The use of two patterns may aid the viewer in understanding the direction the athlete is facing at a given point in the ribbon 460, and also may further aid the viewer in visualizing the rate of angular rotation of the athlete. In one exemplary embodiment, the first pattern 470 and the second pattern 480 may be chosen based on the attire worn by the athlete. Alternately, those of skill in the art will understand that the ribbon 460 may simply be different colors on its two sides, and may provide similar viewer aid to that described above.

Figure 5:
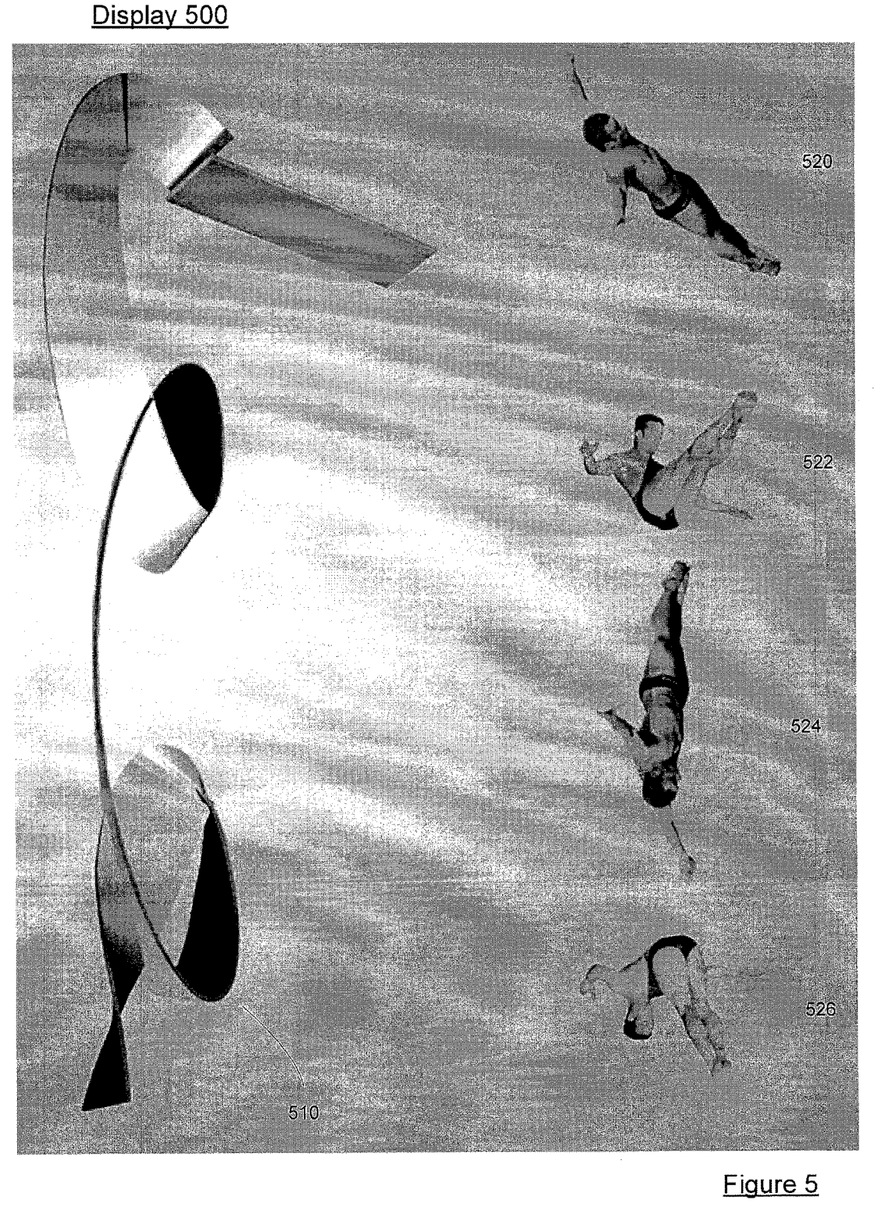
FIG. 5 illustrates a fourth exemplary visualization of the motion of an athlete according to the exemplary method of FIG. 1.

The method 100 was described with reference to a vertical ribbon that spans from a head position and orientation of the athlete to a foot position of the athlete. However, as noted above, in some sports, such as diving, a horizontal ribbon may be preferable for providing information to the viewer. Therefore, in another exemplary embodiment, the endpoints of the lines used to generate the ribbon may represent the left and right sides of the athlete rather than the top and bottom (i.e., head and foot). In such an embodiment, the positions may be determined based on the athlete's orientation and "wingspan" (e.g., of the athlete's shoulders or arms). FIG. 5 illustrates a display 500 including such a ribbon 510, together with an athlete in four positions 520, 522, 524 and 526 summarizing the motion generating the ribbon 510.

While the embodiments described above have referenced projection of the ribbon into two dimensions for display, such as concurrently with video or still images of an athlete, in other embodiments, the ribbon may be provided to users as a three-dimensional ("3D") model. For example, if a television broadcaster is generating the ribbon for television display (i.e., projected into two dimensions) during a broadcast of a sporting event, the broadcaster may additionally provide the 3D object model of the ribbon via the Internet to users who are visiting the television network's website. In such an embodiment, the users may be able to manipulate the ribbon, using standard techniques for the manipulation of 3D, to view it from varying angles, in order to further improve the users' understanding of the sporting event. This function may also be used by a producer of content to further illustrate to viewers, e.g., in an instant replay video, the movement of the athlete.

Figure 6:
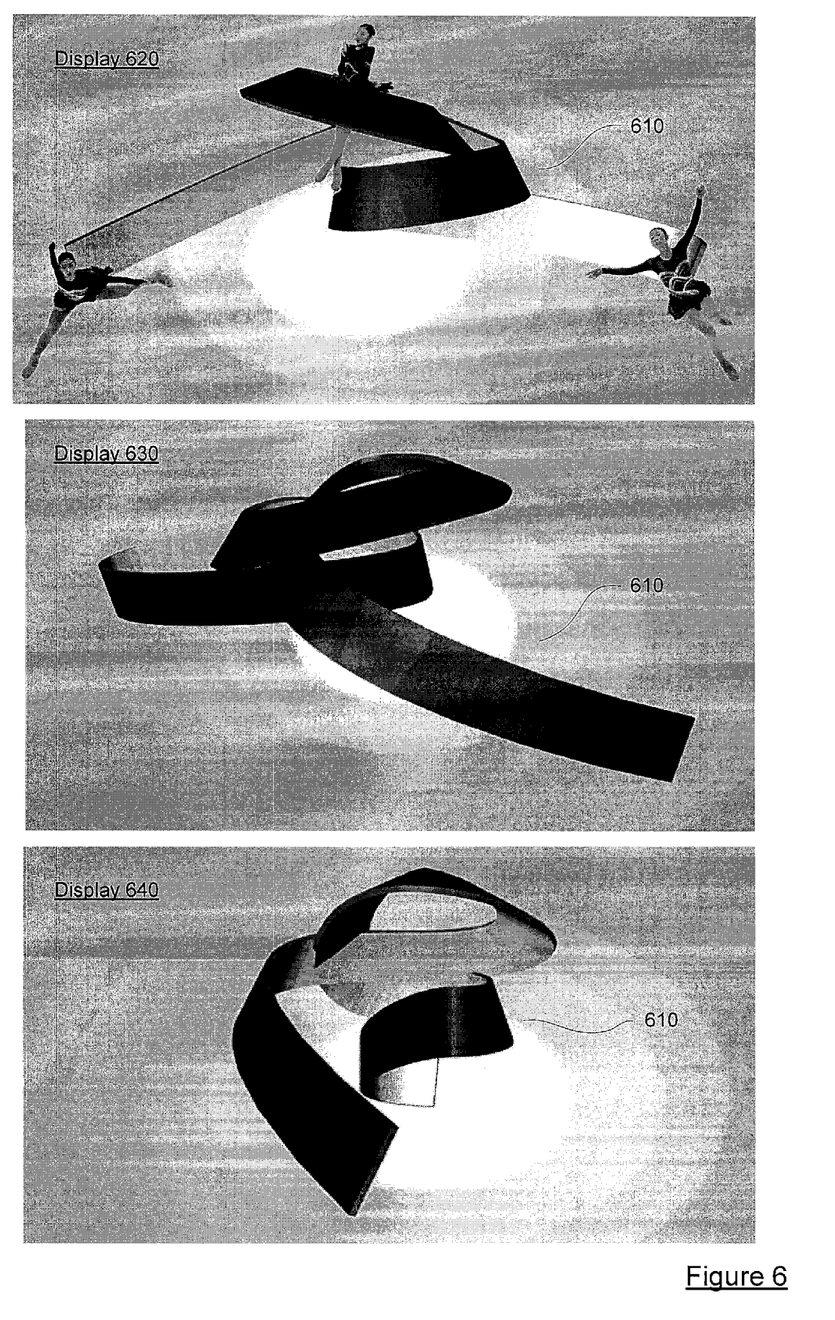
FIG. 6 illustrates three different views of a fifth exemplary visualization of the motion of an athlete according to the exemplary method of FIG. 1.

FIG. 6 illustrates such a ribbon 610, shown in three different views. The first view 620 including ribbon 610 illustrates a figure skater performing a jump in the same manner as shown previously in FIG. 4A. The second view 630 shows the same ribbon 610 from the opposite side of the jump. The third view 640 shows the same ribbon 610 as viewed from behind the athlete's starting position, facing in the direction that the figure skater is traveling. A user may manipulate the ribbon 610 to produce the varying views 620, 630 and 640 by, for example, clicking and dragging a mouse, using keyboard inputs, or any other manner for manipulating the view of a 3D object model that is known in the art.

Figure 7:
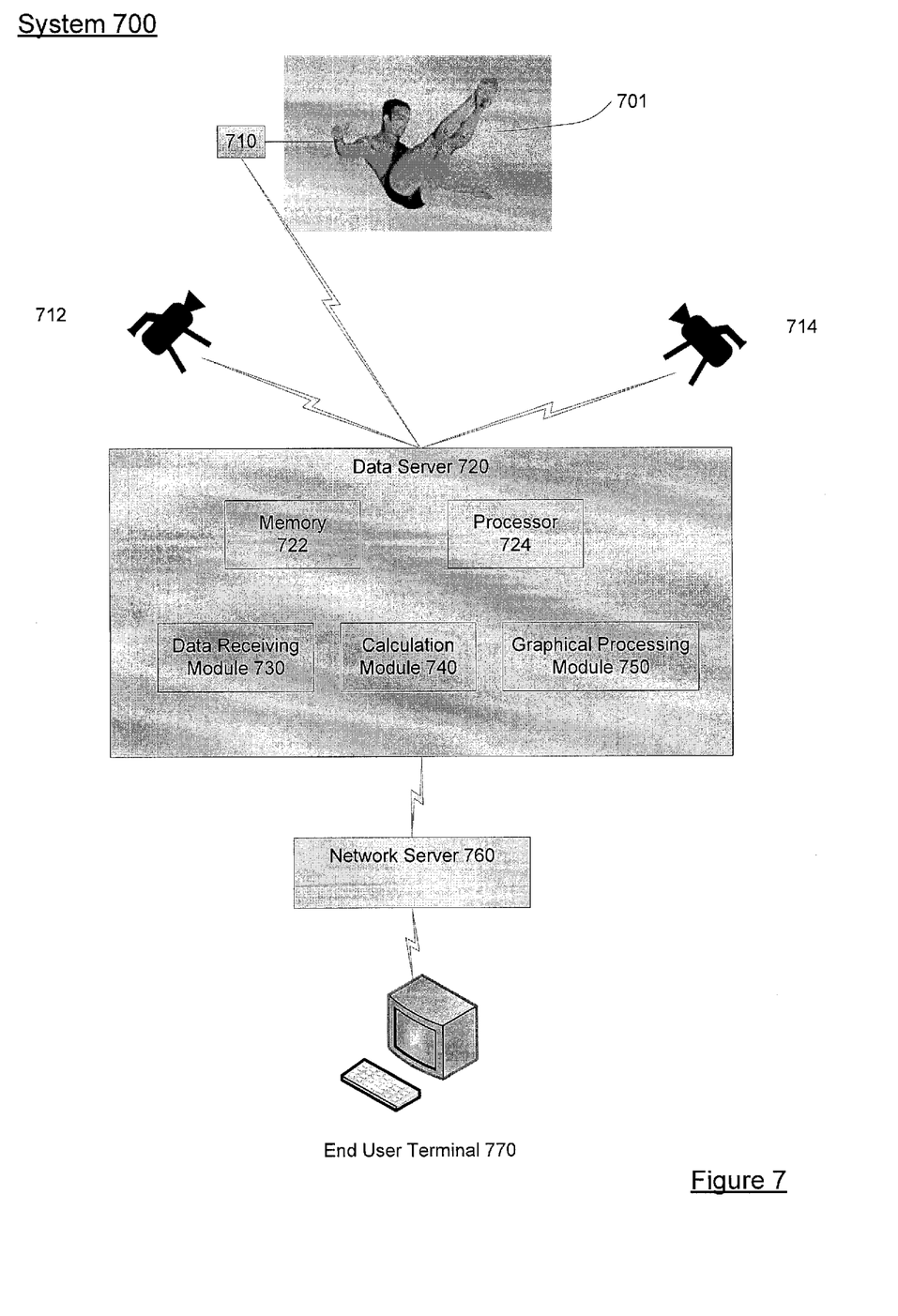
FIG. 7 illustrates an exemplary system for performing the method of FIG. 1 according to an exemplary embodiment.

FIG. 7 illustrates an exemplary system 700 for generating a visualization of the motion of an athlete 701 using a method such as the method 100 of FIG. 1. The system 700 includes data capture devices (e.g., cameras, inertial sensors, detectors, radar guns, LIDAR sensors, etc.) 710, 712 and 714 capturing positional data for the athlete 701 (for example, data relating to the center of mass of the athlete, as well as various body parts that can be used to determine the orientation of the athlete in addition to the position). In the system 700, the data capture device 710 is an onboard data gathering apparatus (e.g., a smart phone) carried or worn by the athlete 701, and the data capture devices 712 and 714 are video cameras recording the motion of the athlete 701 from two different vantage points. However, as described above, those of skill in the art will understand that, in other systems, different types of data capture devices may be used. For example, in one alternative implementation, no onboard data gathering apparatus may be present, and the athlete's positional data may be captured solely by external devices, such as video cameras. In another alternative implementation, a differing number of cameras may be present; for example, four cameras may be present rather than two. In a further alternative implementation, another type of data capture device not expressly described herein may be used.

Data from the data capture devices 710, 712 and 714 is exported to a data server 720. The data server 720 includes a memory 722 which may store the raw data, and a processor 724 that may process the data (e.g., using the exemplary method 100) either in real time or after the event being captured by the data capture devices 710, 712 and 714 has been completed. The data server 720 may include a data receiving module 730 receiving data at a potentially high rate from the data capture devices 710, 712 and 714 and properly formatting it for storage in the memory 722, a calculation module 740 performing the calculations necessary to convert the athlete positional data into the ribbon as described above with reference to method 100, and a graphical processing module 750 formatting the ribbon data for display to users, such as projecting the ribbon into two dimensions for display with a still image or video of the athlete. Those of skill in the art will understand that the data receiving module 730, the calculation module 740, and the graphical processing module 750 may be may be software modules comprising lines of code, and may be stored in memory 722 and executed by processor 724.

The processed data (e.g., the head and foot positions, lines, and ribbon) generated by the processor 724 may also be stored in the memory 722 for subsequent use or retrieval. The data server 720 may also be communicatively coupled to a broadcast server 760, which may provide the processed data to an end user terminal 770. As described above, the broadcast server 760 may be adapted for video broadcast (e.g., over-the-air, cable television, satellite television, etc.) or data broadcast (e.g., over the Internet, an intranet, etc.), and the end user terminal 770 may be a type of terminal appropriate for the nature of the broadcast server 760 (e.g., a television, a desktop or laptop computer, a tablet, a smart phone, etc.).

Therefore, the exemplary embodiments described above may enable viewers of sporting events to better understand and visualize the progress of rapidly moving athletes. The exemplary embodiments may allow for greater accuracy of illustration of the motion of athletes than previous efforts to accomplish the same results, and may allow for data-driven visualization that directly correlates with the athlete's body. The exemplary embodiments may be implemented in a manner that allows for real-time illustration, or with post-processing with lower computing power requirements.

Those of skill in the art will understand that the above-described exemplary embodiments may be implemented in any number of matters, including as a software module, as a combination of hardware and software, etc. For example, the exemplary method 100 may be embodied in a program stored in a non-transitory storage medium and containing lines of code that, when compiled, may be executed by a processor.

It will be apparent to those skilled in the art that various modifications may be made to the exemplary embodiments, without departing from the spirit or the scope of the invention. Thus, it is intended that the present invention cover modifications and variations of this invention provided they come within the scope of the appended claims and their equivalents.

What is claimed is:

1. A method, comprising:
    receiving positional data corresponding to stages of movement of a person within a time interval, wherein the person includes a top side, a bottom side, a left side and a right side, the sides being identified relative to a center of mass of the person at a beginning of the time interval;
    determining from the positional data, at each stage of movement, a position, an orientation, and a pose of the person; and
    based on the position, the orientation, and the pose of the person determined for each stage of movement, generating a visualization graphic, separate from a display of the person, that includes a ribbon orientated to reflect the positions, orientations, and poses of the person at the stages of movement within the time interval, wherein the ribbon includes:
        a first surface having a first pattern corresponding to one of a direction the person is facing or the left side of the person, and
        a second surface having a second pattern corresponding to one of an opposite direction the person is facing or the right side of the person.

2. The method of claim 1, wherein the visualization graphic includes at least one ghost image reflecting the positions, orientations, and poses of the person at a time in the time interval.

3. The method of claim 1, wherein the determining, at each of a plurality of times within the time interval, one of a position, an orientation, and a pose of the person, comprises:
    determining, based on the received positional data, a plurality of central positions of the person in a three-dimensional space, each of the plurality of central positions corresponding to one of the plurality of times;
    determining, based on each the plurality of central positions, a plurality of first endpoints of the person in the three-dimensional space and a plurality of second endpoints of the person in the three-dimensional space, each of the plurality of first endpoints and each of the plurality of second endpoints corresponding to one of the central positions and one of the times.

4. The method of claim 3, wherein the generating the visualization graphic, separate from a display of the person, that illustrates the one of the positions, orientations, and poses of the person within the time interval comprises:
    generating a plurality of line segments in the three-dimensional space, each of the line segments being generated between one of the plurality of first endpoints and the corresponding one of the plurality of second endpoints, each of the line segments corresponding to one of the sampling times; and
    interpolating a path in the three-dimensional space representing motion of the person during the time interval, the path being interpolated between each pair of the line segments corresponding to consecutive sampling times for each stage.

5. The method of claim 4, wherein the generating the visualization graphic, separate from a display of the person, that illustrates the positions, orientations, and poses of the person within the time interval further comprises:
    rendering the path into a two-dimensional view.

6. The method of claim 4, further comprising:
    deflecting the ribbon from a vertical orientation proportionally to an angular rate of rotation of the person.

7. The method of claim 6, further comprising:
    truncating the deflected ribbon.

8. The method of claim 1, wherein a plurality of colors are added to the visualization graphic, each of the plurality of colors representing one of a linear speed of the person, an angular speed of the person, an acceleration of the person, and an amount of rotation of the person.

9. The method of claim 3, wherein the first endpoints correspond to one of the top side and the right side of the person, and wherein the second endpoints correspond to one of the bottom side and the left side of the person.

10. The method of claim 1, wherein the positional data is received from one or more sources, and wherein the sources include one of a video camera and a sensor disposed on the person.

11. The method of claim 1, wherein generating the visualization graphic includes generating a three-dimensional object model.

12. A system, comprising:
    a data source collecting positional data corresponding to stages of a movement of a person within a time interval, wherein the person includes a top side, a bottom side, a left side and a right side, the sides being identified relative to a center of mass of the person at a beginning of the time interval; and
    a data server, comprising:
        a data receiving module receiving the positional data;
        a calculation module determining, based on the positional data at each of the stages of movement within the time interval, a position, an orientation and a pose of the person; and
        a graphical processing module generating, based on the position, the orientation, and the pose of the person determined for each stage of movement a visualization graphic, separate from a display of the person, that includes a ribbon orientated to reflect the positions, the orientations and the poses of the person at the stages of movement within the time interval, wherein the visualization graphic includes:

a first having a first pattern corresponding to one of a direction the person is facing or the left side of the person, and a second having a second pattern corresponding to one of an opposite direction the person is facing or the right side of the person.

13. The system of claim 12, wherein the calculation module determines the position, the orientation, and the pose of the person by determining, based on the received positional data, a plurality of central positions of the person in a three-dimensional space, each of the plurality of central positions corresponding to one of the plurality of times, and determining, based on each the plurality of central positions, a plurality of first endpoints of the person in the three-dimensional space and a plurality of second endpoints of the person in the three-dimensional space, each of the plurality of first endpoints and each of the plurality of second endpoints corresponding to one of the central positions and one of the times.

14. The system of claim 13, wherein the graphical processing module generates the visualization graphic by generating a plurality of line segments in the three-dimensional space, each of the line segments being generated between one of the plurality of first endpoints and the corresponding one of the plurality of second endpoints, each of the line segments corresponding to one of the sampling times, and interpolating a path in the three-dimensional space representing motion of the person during the time interval, the path being interpolated between each pair of the line segments corresponding to consecutive sampling times for each stage.

15. The system of claim 12, wherein the person is an athlete and the time interval is a duration of a sporting event.

16. The system of claim 12, wherein the positional data source comprises one of a video camera and a sensor disposed on the person.

17. The system of claim 16, wherein a two-dimensional view is a view of a video broadcast of the person during the time interval, and wherein the graphical processing module further superimposes the two-dimensional view over the video broadcast.

18. The system of claim 12, further comprising:
a broadcast server providing data relating the visualization graphic to a user terminal.

19. The system of claim 18, wherein the broadcast server provides the data by means one of a television broadcast and a data stream transmitted over a packet network.

* * * * *

UNITED STATES PATENT AND TRADEMARK OFFICE
CERTIFICATE OF CORRECTION

PATENT NO. : 9,836,863 B2  
APPLICATION NO. : 13/651762  
DATED : December 5, 2017  
INVENTOR(S) : Kennedy Page 1 of 1

It is certified that error appears in the above-identified patent and that said Letters Patent is hereby corrected as shown below:

In the Claims

Claim 3, Column 7, Lines 65-66:
"determining, based on each the plurality of central positions, a plurality of first endpoints of the person in the" should read "determining, based on each of the plurality of central positions, a plurality of first endpoints of the person in the".

Claim 19, Column 10, Line 22:
"provides the data by means one of a television broadcast and" should read "provides the data by means of one of a television broadcast and".

Signed and Sealed this
Fourth Day of June, 2019

Andrei Iancu
*Director of the United States Patent and Trademark Office*